(12) United States Patent
Clynne et al.

(10) Patent No.: US 10,612,753 B2
(45) Date of Patent: Apr. 7, 2020

(54) ROADWAY FIXTURE SYSTEMS WITH INTEGRATED TRANSCEIVING EQUIPMENT

(71) Applicant: Current Lighting Solutions, LLC, Cleveland, OH (US)

(72) Inventors: Thomas Clynne, East Cleveland, OH (US); Himamshu Viswat Prasad, East Cleveland, OH (US); Jonathan Meyer, Shaker Heights, OH (US); Koushik Babi Saha, Strongsville, OH (US)

(73) Assignee: Current Lighting Solutions, LLC, East Cleveland, OH (US)

( * ) Notice: Subject to any disclaimer, the term of this patent is extended or adjusted under 35 U.S.C. 154(b) by 191 days.

(21) Appl. No.: 15/814,836

(22) Filed: Nov. 16, 2017

(65) Prior Publication Data

US 2018/0172243 A1   Jun. 21, 2018

Related U.S. Application Data

(60) Provisional application No. 62/436,397, filed on Dec. 19, 2016.

(51) Int. Cl.
*F21S 8/08* (2006.01)
*H01Q 1/22* (2006.01)
(Continued)

(52) U.S. Cl.
CPC ............... *F21V 15/01* (2013.01); *F21S 8/08* (2013.01); *H04W 84/18* (2013.01); *H05B 47/11* (2020.01);
(Continued)

(58) Field of Classification Search
CPC ............ F21S 8/085; F21S 8/086; F21S 8/088; H01Q 1/22; H01Q 1/246; F21V 15/01;
(Continued)

(56) References Cited

U.S. PATENT DOCUMENTS 3,654,453 A * 4/1972 Jablonski ............... F21S 8/086
                                                                 362/326
5,823,665 A * 10/1998 Braun ..................... F21S 8/086
                                                                 362/376
(Continued)

FOREIGN PATENT DOCUMENTS

WO     2014/184581 A1    11/2014

OTHER PUBLICATIONS

U.S. Appl. No. 62/373,651, filed 2016.*
(Continued)

*Primary Examiner* — Bao Q Truong
*Assistant Examiner* — Steven Y Horikoshi
(74) *Attorney, Agent, or Firm* — Buckley, Maschoff & Talwalkar LLC (57) ABSTRACT

A roadway fixture system includes a lighting fixture having an outer housing that holds one or more light devices. The outer housing includes an access door through which an interior of the lighting fixture is accessible. The system also includes a radio frequency (RF) transceiver configured to send and receive cellular communications. The RF transceiver includes a mounting plate that is sized and shaped to fit into a space occupied by the access door of the outer housing of the lighting fixture so that the RF transceiver is mounted to the lighting fixture.

4 Claims, 9 Drawing Sheets

(51) Int. Cl.

| | | |
|---|---|---|
| *F21V 15/01* | (2006.01) | |
| *H04W 84/18* | (2009.01) | |
| *H05B 47/11* | (2020.01) | |
| *H05B 47/19* | (2020.01) | |
| *F21W 131/103* | (2006.01) | |
| *F21V 33/00* | (2006.01) | |
| *F21Y 113/00* | (2016.01) | |
| *F21Y 115/10* | (2016.01) | |

(52) U.S. Cl.
CPC .......... *H05B 47/19* (2020.01); *F21V 33/0052* (2013.01); *F21W 2131/103* (2013.01); *F21Y 2113/00* (2013.01); *F21Y 2115/10* (2016.08)

(58) Field of Classification Search
CPC ..... F21V 33/0052; H05B 47/11; H05B 47/19; F21Y 2115/10; F21Y 2113/00; F21W 2131/103
See application file for complete search history.

(56) References Cited

U.S. PATENT DOCUMENTS

| | | | |
|---|---|---|---|
| 5,894,407 A * | 4/1999 | Aakalu | .............. H05K 7/20154 165/185 |
| 6,467,928 B2 | 10/2002 | Crelin | |
| 7,845,821 B2 | 12/2010 | Herst et al. | |
| 8,445,826 B2 | 5/2013 | Verfuerth | |
| 8,586,902 B2 | 11/2013 | Verfuerth | |
| 9,625,133 B2 | 4/2017 | Mandy et al. | |
| 2007/0252528 A1 | 11/2007 | Vermuelen et al. | |
| 2008/0080162 A1 * | 4/2008 | Wilcox | ................... F21S 8/086 362/20 |
| 2010/0296285 A1 | 11/2010 | Chemel et al. | |
| 2010/0302779 A1 | 12/2010 | Chemel et al. | |
| 2011/0299290 A1 | 12/2011 | Mandy et al. | |
| 2012/0274208 A1 | 11/2012 | Chen et al. | |
| 2013/0155675 A1 | 6/2013 | Wassel | |
| 2014/0211487 A1 * | 7/2014 | Spiro | ...................... F21V 23/06 362/382 |
| 2014/0341588 A1 | 11/2014 | Pederson | |
| 2015/0115802 A1 | 4/2015 | Kuti et al. | |
| 2015/0341114 A1 | 11/2015 | Pederson | |
| 2016/0003465 A1 * | 1/2016 | Roh | ....................... F21V 23/06 362/235 |
| 2016/0192457 A1 | 6/2016 | Chen et al. | |
| 2016/0329630 A1 * | 11/2016 | Mustajarvi | ............... H01Q 1/12 |
| 2018/0045388 A1 * | 2/2018 | McDowell | .............. F21V 29/15 |

OTHER PUBLICATIONS

"Mast Technologies," RF Absorbers, retrieved from the Internet URL: http://www.masttechnologies.com/rf-absorbers/, on May 16, 2018, pp. 1-7.

"MLP-100-AZ RF Reflective Primer," AZ Technology, retrieved from the internet URL: http://www.aztechnology.com/materials-coatings-MLP-100-AZ.html, on May 16, 2018, p. 1.

International Search Report and Written Opinion issued in connection with corresponding PCT Application No. PCT/US2017/063819 dated Mar. 16, 2018.

* cited by examiner

ROADWAY FIXTURE SYSTEMS WITH INTEGRATED TRANSCEIVING EQUIPMENT

CROSS-REFERENCE TO RELATED APPLICATIONS

This application claims priority to U.S. Provisional Application No. 62/436,397, which was filed on 19 Dec. 2016, and the entire disclosure of which is incorporated herein by reference.

FIELD

The subject matter described herein relates to the integration (e.g., mounting) of radio transceiver hardware to roadway fixtures such as lighting poles and lighting fixtures. It describes aspects of the issues associated with the use of such hardware in the field, and aspects of how these problems may be solved and improved upon by use of the described embodiments.

BACKGROUND

Lighting fixtures (e.g., outdoor or roadway fixtures) generally comprise a housing, a connection to a mains power line, and one or more lighting elements, as well as associated electrical drivers and optical elements. Outdoor light fixtures are generally mounted to a pole arm which extends from a utility pole or other structure. Some outdoor light fixtures extend generally perpendicularly (laterally) from the pole in a generally horizontal direction.

Due to their virtue of being placed above the ground and distributed throughout a city or along roads, outdoor fixtures and the poles/arms have been considered as a convenient platform for the mounting of additional hardware components such as sensor systems, communications systems and other devices and materials. There are cosmetic issues associated with the addition of extra hardware together with the light fixture, due to the variety of clamps, wires, cables, boxes and other components which may detrimentally alter the look of the light fixture if not done with careful thought. Further, the wide variety of hardware may make servicing and maintenance of this equipment difficult, due to having so many potential options as to what is integrated and the means by which the equipment was mounted.

BRIEF DESCRIPTION

In one embodiment, a system includes a lighting fixture having an outer housing that holds one or more light devices. The outer housing includes an access door through which an interior of the lighting fixture is accessible. The system also includes a radio frequency (RF) transceiver configured to send and receive cellular communications. The RF transceiver includes a mounting plate that is sized and shaped to fit into a space occupied by the access door of the outer housing of the lighting fixture so that the RF transceiver is mounted to the lighting fixture.

In one embodiment, a method includes removing an access door in an outer housing of a lighting fixture having one or more lighting devices. The access door providing access into an interior of the outer housing. The method also includes coupling a mounting plate of a radio frequency (RF) transceiver with the outer housing of the lighting fixture in a location from which the access door of the outer housing was removed. The RF transceiver is configured to send and receive cellular communications.

In one embodiment, a system includes a radio frequency (RF) transceiver configured to send and receive cellular communications, and a mounting plate coupled with the RF transceiver. The mounting plate is shaped and sized to fit into an access door opening through an outer housing of a lighting fixture. The mounting plate is configured to be at least partially received into the access door opening of the lighting fixture after removal of an access door of the outer housing of the lighting fixture.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The inventive systems and methods described herein can be used to mount transceiving equipment (e.g., cellular telephone equipment and components) with roadway fixtures, such as lighting fixtures mounted along roadways. The systems and methods can be used to expand the data-handling capabilities of telecommunications infrastructures by providing a smaller-scale approach to expanding wireless data networks. The transceiving equipment can be smaller and lower power radio frequency (RF) equipment (relative to cellular towers), which can be used as small-cells or micro-cells in a cellular network. A feature of such micro-cells is that the cells typically have a reduced communication range relative to the larger cellular base stations with large antenna towers and racks of equipment. The reduced communication range allows for the use of smaller antennas and lower power RF transceivers and have a correspondingly smaller physical size and footprint. The size of micro-cell equipment has been reduced to such a level where the mounting of a micro cell radio in conjunction with a lighting fixture or pole is feasible. One or more embodiments of the systems and methods described herein provide efficient systems methods for mounting a micro-cell radio in conjunction with a lighting fixture. Embodiments of the systems and methods described herein optionally can provide the micro-cell radio equipment, the power, structural support, and a connection to land-based optical fiber or wire data communications systems.

In one embodiment, the inventive systems and methods described herein provide for removal or replacement of an access panel, door, cover, or portion of an outer housing of an existing lighting fixture. This panel, door, or housing portion (referred to herein as an access door) can be removed to provide for a location for the transceiving equipment to be coupled with the lighting fixture without otherwise modifying, damaging, or changing the lighting fixture. For example, an existing (already installed) lighting fixture can be retrofitted to include the transceiving equipment by removing the access door of the lighting fixture and coupling the transceiving equipment to the location where the access door previously was located. The transceiving equipment can have a mounting plate that has the same size and/or shape of the access door so that the transceiving equipment can easily be mounted to the lighting fixture. For example, the mounting plate (or a portion thereof) can be coupled with the lighting fixture in the same way that the access door previously was mounted to the lighting fixture. The transceiving equipment can be coupled with a variety of differently shaped and/or sized mounting plates to allow for the same transceiving equipment to be retrofitted to a variety of different lighting fixtures having access doors of different shapes and/or sizes.

Figure 1:
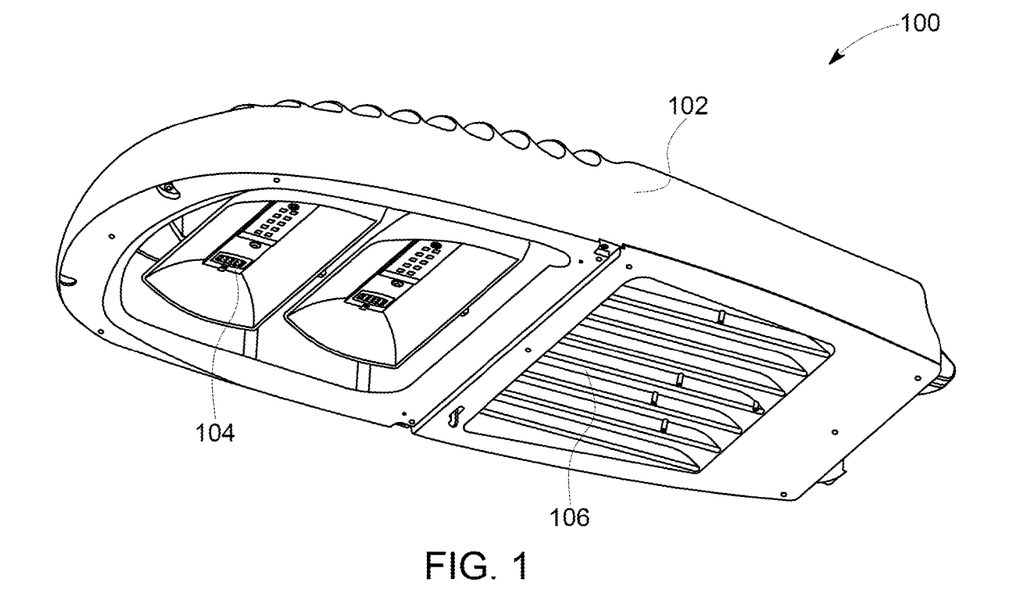
FIG. 1 illustrates a perspective view of one embodiment of a lighting fixture.

FIG. 1 illustrates a perspective view of one embodiment of a lighting fixture 100. The lighting fixture 100 includes an outer housing 102 that holds one or more lighting devices 104 and associated electronic components (e.g., drivers, wires, contacts, etc.). The lighting devices 104 can include high pressure sodium or mercury High Intensity Discharge (HID) lamps and associated high voltage ballasts, light emitting diodes (LEDs), incandescent bulbs, or the like.

The housing 102 includes a removeable access door 106 that allows access to the interior components of the roadway fixture 100. The door 106 can provide access to mounting hardware (not visible in FIG. 1), such as a pole arm mounting or clamping mechanism. The access door 106 may also provide protection and coverage for electrical interconnection components (such as terminal blocks) used to make electrical connections, electrical surge suppression components which are used for safely handling electrical power line transients, and transformer components for use in changing the input line voltage from the main pole power supply line to a voltage sufficient to operate the fixture. Such a fixture access door may be top or bottom mounted. There may also be variants which would allow access from the sides of the fixture.

The housing 102 also includes mounting hardware (not visible in FIG. 1), such as a "Slip Fitter," which is a radial clamping and positional-adjustment device that allows for the proper structural support of the fixture on a pole arm and also allows the installer to adjust the angle of the fixture relative to the pole arm and/or the surface of the ground. There are other attachment methods, such as methods that utilize a clamping force around the pole arm to secure the fixture. In other instances, fixtures may be mounted to a pole arm by a direct bolt interface that provides a mounting flange extending from the pole to which a similar flange or bolt pattern is found on the fixture or some intermediary part to attach the fixture to the pole. Optionally, the fixtures can be mounted to a horizontal part of a pole or other structure, without being mounted to or on a pole arm.

The interface that couples the lighting fixture to the pole arm or other surface can be duplicated (e.g., also included) in the transceiving equipment described herein. This allows for the transceiving equipment to be mounted to or on the same objects or surfaces as the lighting fixture, without having to modify or change the objects or surfaces to which the lighting fixtures and/or transceiving equipment is mounted.

Figure 2:
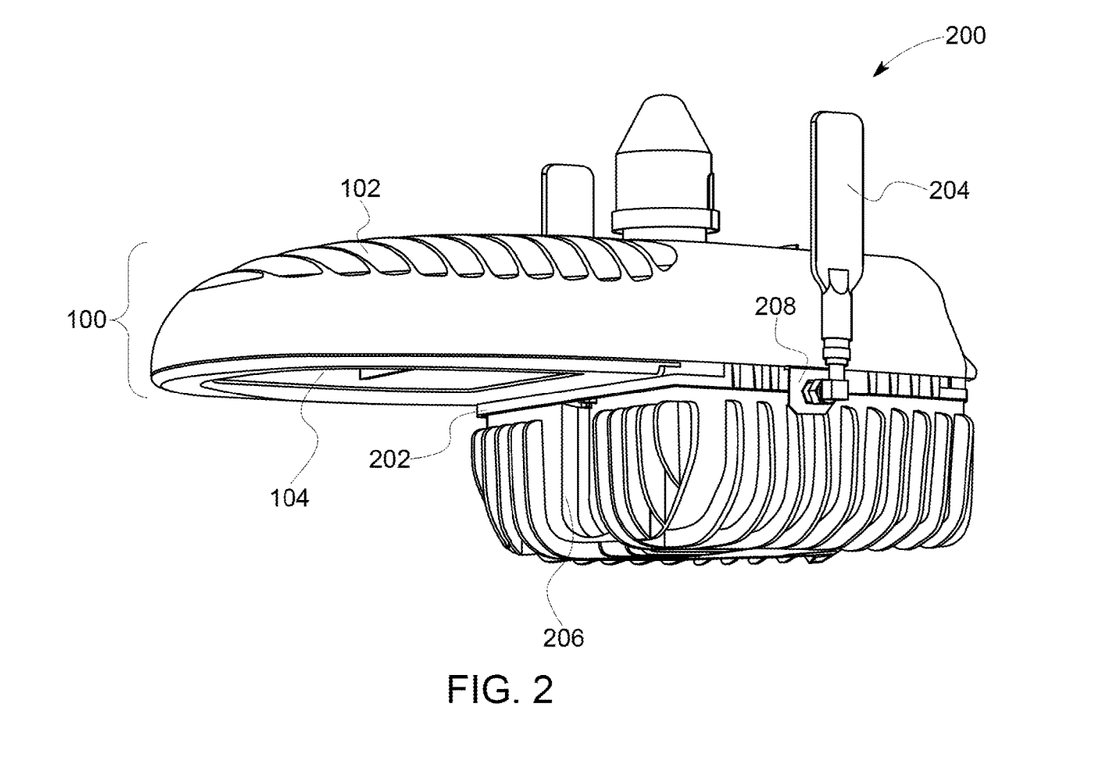
FIG. 2 illustrates a perspective view of another embodiment of a roadway fixture system.
Figure 3:
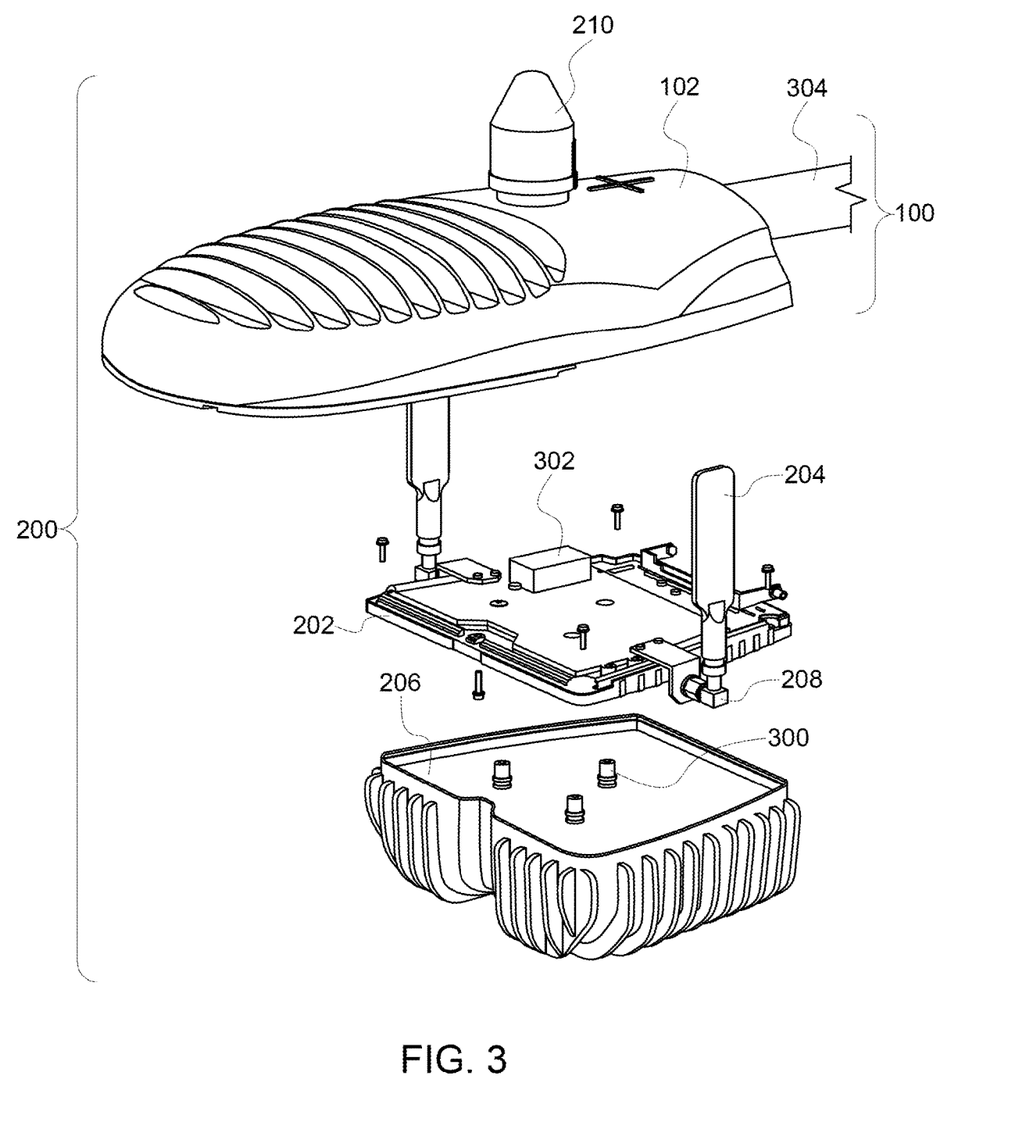
FIG. 3 illustrates an exploded view of the roadway fixture system shown in FIG. 2.

FIG. 2 illustrates a perspective view of another embodiment of a roadway fixture system 200. FIG. 3 illustrates an exploded view of the roadway fixture system 200. The roadway fixture system 200 includes the lighting fixture 100 shown in FIG. 1 in that the system 200 includes at least the housing 102 and the lighting devices 104 of the lighting fixture 100. The system 200 includes a mounting plate 202 that is coupled with the housing 102 in place of the access door 106 (in one embodiment), or that is coupled with the access door 106 of the housing 102 (in another embodiment). The mounting plate 202 is a primarily planar or flat body that can be secured to the housing 102 and that provides a mechanical interface to the housing 102 for components described herein. One or more antennas 204 of an RF transceiver 206 can be mounted on the mounting plate 202 and conductively coupled with the RF transceiver 206 by one or more contacts 300 (shown in FIG. 3).

The access door 106 can be removed to provide an integratable mounting interface or the transceiving equipment (e.g., transceiver 206). Because the mounting plate 202 (or a portion thereof) can have the same size and/or shape as the access door 106, the mounting plate 202 can couple with the lighting fixture to provide a sealed and/or weather resistant interface with the lighting fixture. As described herein, the transceiving equipment can be thermally coupled with the lighting fixture or with heat sinks to provide for thermal transfer of heat away from the transceiving equipment. The transceiving equipment also can be conductively coupled with the same power source that provides power to the lighting fixture so as to eliminate the need for additional power sources and/or connections to other power sources. This can allow for easy installation of the transceiving equipment and potentially avoid the need for highly trained and/or specialized personnel to install the transceiving equipment.

A network interface 302 (shown in FIG. 3) optionally can be mounted onto the mounting plate 202. The network interface 302 allows for the system 200 to communicate with one or more computerized communication networks via fiber or cable connections. The network interface 302 can include conductive contacts that couple with one or more wires or cables for communicatively coupling the transceiver 206 and/or other auxiliary hardware components of the system 200 with one or more networks. The network interface 302 can be, for example, a fiber channel switch, an Ethernet switch, or the like. Alternatively, the network interface 302 can represent one or more other auxiliary hardware components that are connected with the mounting plate 202. These components can include one or more of power filtering circuitry or hardware, power measuring circuitry or hardware, a fiber interface component, an additional transceiver, a camera, a sensor, a wireless network transceiver, a telephone interface component for connecting with a telephone network, or the like.

The contacts 300 in the transceiver 206 can connect circuitry in the transceiver 206 with a power source through the mounting plate 202 (e.g., a mains power line that also is coupled with the lighting devices 104), with the antennas 204, and/or with the network interface 302. The transceiver 206 can thereby be powered by the same power source that powers the lighting devices 104, can connect with the antennas 204 for wireless communication (e.g., cellular communication), and/or can communicate with one or more networks via a wired connection by the network interface 302. Optionally, one or more batteries can be disposed in the housing 102, the transceiver 206, and/or coupled with the mounting plate 202. These batteries can be coupled with the transceiver 206 for powering the transceiver 206 in the event that another power source (e.g., the utility grid) that powers the lighting devices 104 is no longer available to power the transceiver 206. The batteries can be charged by this other power source and/or by other components (e.g., photovoltaic devices such as solar panels, or other energy harvesting devices).

The transceiver 206 may be a low power and/or short range cellular transceiver that is used for cellular communication (via the antennas 204). For example, the transceiver 206 may have a wireless communication range of no longer than two kilometers in one embodiment. Alternatively, the transceiver 206 may have a shorter or longer wireless communication range. The transceiver 206 can operate at low power, such as a transmit power of no more than three watts, a transmit power of no more than one watt, a transmit power or no more than half of a watt, or another low power limit. The transceiver 206 operates to create a small communication cell, or micro-cell, for cellular communication. Other cellular devices (e.g., mobile phones) operating within the wireless range of the transceiver 206 can wirelessly communicate through or via the transceiver 206, similar to how these devices would communicate through or via the larger and higher power cellular base stations or towers.

The transceiver 206 and antennas 204 are coupled with the housing 102 of the lighting fixture 100 such that the roadway fixture system 200 can be mounted to a fixture support 304 (shown in FIG. 3). For example, the transceiver 206 and antennas 204 can be coupled with the lighting fixture 100, and the lighting fixture 100 can be coupled with a pole arm or other pole that extends upward from a surface (e.g., a sidewalk, road, etc.) and/or horizontally over the surface (e.g., from a building, wall, etc.). Alternatively, the lighting fixture 100 can be directly mounted onto a wall or other surface. Locating the fixture system 200 in an elevated position or state allows the fixture system 200 to both illuminate an area beneath the lighting devices 104 and provide a cell for cellular communications. Several of the roadway fixture systems 200 can be dispersed through a city, town, or the like, to create a grid of micro-cells used for cellular communications, while also illuminating streets, sidewalks, and the like.

The transceiver 206, antennas 204, and/or mounting plate 202 (and components mounted thereon or coupled thereto) can be retrofitted to an existing lighting fixture 100. For example, the transceiver 206, antennas 204, and/or mounting plate 202 can be coupled with a lighting fixture 100 previously installed on the support 304. The transceiver 206, antennas 204, and/or mounting plate 202 do not need to be coupled with the lighting fixture 100 prior to mounting the lighting fixture 100 onto the support 304 in one embodiment.

The transceiver 206 and antennas 204 are coupled with the lighting fixture 100 in close proximity to the housing 102 of the lighting fixture 100. For example, the transceiver 206 may abut the housing 102 of the lighting fixture 100. Alternatively, the transceiver 206 and/or antennas 204 may be spaced farther from the lighting fixture 100. For example, the lighting fixture 100 can be coupled with the distal end of the support 304 (e.g., the end of the pole that is farthest from the ground, building, wall, or other surface from which the support 304 extends), with the transceiver 206 and/or antennas 204 disposed farther from the distal end. This can allow for the transceiver 206 and/or antennas 204 to avoid or reduce interference between the cell generated by the transceiver 206 and antennas 204 and operation of other components in the lighting fixture 100.

The antennas 204 can be mounted to the mounting plate 202 using adjustable mounting interfaces 208. The interfaces 208 can include ball type swivels, rotary swivels, and/or lateral/vertical translation bracketry which will help the antennas 204 to clear the adjacent housings which may cause shadowing of the RF signals. The antennas 204 can be placed in various orientations for directing or orienting the wireless signals transmitted from the antennas 204. Optionally, one or more surfaces of the housing 102, the mounting plate 202, and/or other components of the fixture system 200 can be coated with an RF reflective coating or an RF absorbing coating. The orientation of the antennas 204 and/or the coatings can modify the shape of the cellular beam patterns emanating from the antennas 204. The shape of these patterns can be modified to avoid locations where cellular interference may occur.

In the illustrated embodiment, the lighting fixture 100 also includes a sensor node 210. The sensor node 210 includes one or more sensors disposed in an outer housing for monitoring characteristics about or near the fixture system 200. For example, a global positioning system receiver for determining locations, an accelerometer for measuring or detecting movement, a thermometer or thermocouple for measuring temperatures, a microphone for measuring or detecting sounds, or the like, can be disposed within the sensor node 210. These sensors can communicate with one or more other devices via one or more networks by communicating through the network interface 402 and/or the transceiver 206.

Figure 4:
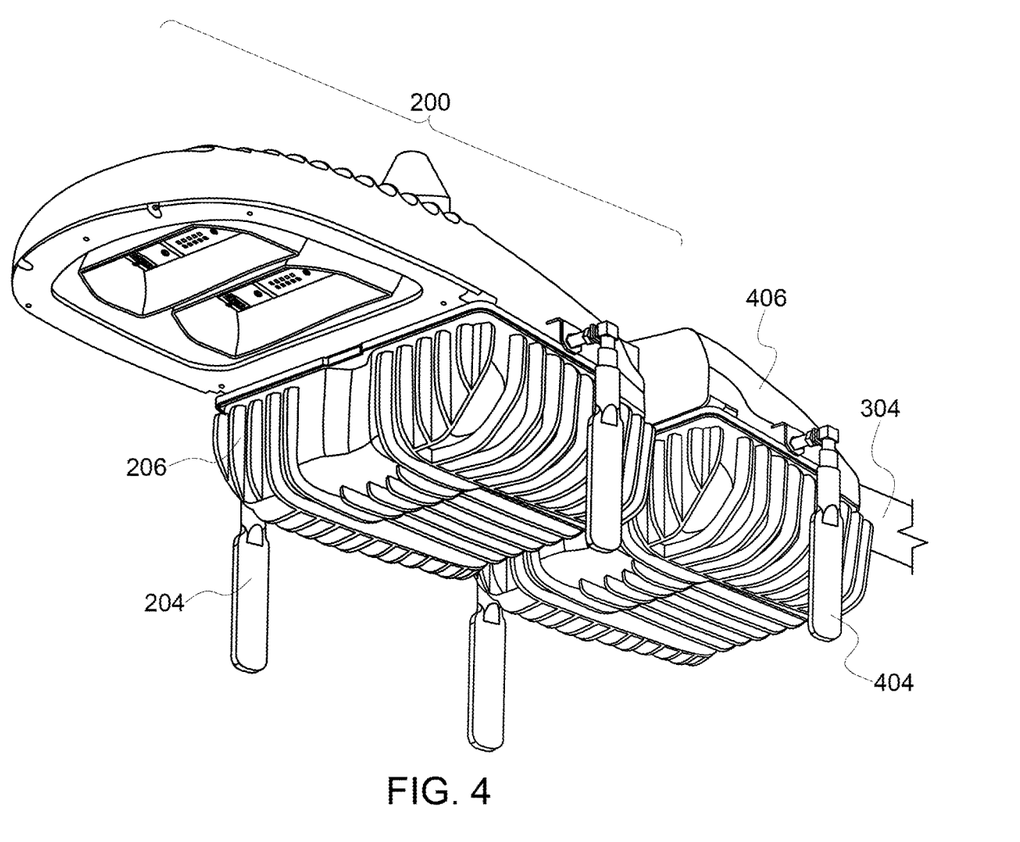
FIG. 4 illustrates a perspective view of another embodiment of a roadway fixture system.

The embodiment of the fixture system 200 shown in FIGS. 2 through 4 can be referred to as an Integral Configuration (IC) 200. IC 200 provides an efficient way to integrate communications hardware with a lighting fixture 100 or lighting fixture poles 304 in a cosmetically attractive and uniform fashion. This embodiment can provide a platform where a plurality of communications hardware manufacturers can take advantage of standard interfaces and mounting techniques, which in turn can allow the communications providers to provide systems 200 which look attractive and uniform in appearance.

The IC 200 shown in FIGS. 2 and 3 can be used for mounting a small-cell RF transceiver 206. The IC 200 generally includes an intermediate mounting plate or interface 202, which can interface with an existing fixture access door 106. This configuration can provide a standard interface for the mounting of different types of antennas 204. It can further provide a mounting platform for a variety of auxiliary hardware 302, such as power filtering hardware, power measurement/monitoring hardware, or fiber interface components. Along with these interfaces, the IC 200 also can provide a mechanical interface for the mounting of different types of transceiver equipment 206. Alternatively, the intermediate mounting plate interface 202 can be unique for one type of transceiver 206.

The integral-configuration type of mounting plate interface 202 may also be capable of permitting the passage through of connectors or contacts 300 on the transceiver 206, or the mounting plate interface 202 may possess a direct-connect interface for the attachment said connectors to the antenna 204 and/or fiber interfaces or other associated hardware or functional components 302. Electrical power can be provided by the fixture components by virtue of attachment to the mains line power provided by the lighting pole 304. If appropriate, such mains line power may be stepped down or modified by the use of a transformer or direct current (DC) power supply. These components could be located on the IC interface 202 or elsewhere such as inside the fixture housing 102.

In some embodiments, backup electrical power may be provided by the addition of a rechargeable battery and charging circuitry. In some embodiments, circuitry could be provided that would sense when the line power has either been cut or been altered (such as a low voltage "brown out"), and thus power can be switched to the battery backup so that cellular communications could be continuously provided. This same circuitry may be capable of switching the line power back on, once normal conditions had returned.

The IC type of interface may also be provided with brackets or other mechanical attachments of hardware, such as a sensor or camera system, or a local wi-fi or Bluetooth communications component. These additional mechanical attachments may exist integral to the IC interface as a single piece, or may be attached separately and be located above, below or laterally to the rest of the system. Furthermore, an important embodiment of the disclosure includes the presence of a signal interface that is capable of providing a fiber (or other wired) data interface for "back haul" to the telephone network, and/or capability for a public Wi-Fi access system to the internet or Internet.

FIG. 4 illustrates a perspective view of another embodiment of a roadway fixture system 400. The roadway fixture system 400 is similar to the roadway fixture system 200 shown in FIGS. 2 and 3 in that the system 400 includes the system 200, but also includes an additional cellular RF transceiver 406 and associated antennas 404. The transceiver 406 can be similar or identical to the transceiver 206, but is coupled with the support 304 between the system 200 and the end of the support 304 in the surface from which the support 304 protrudes. The additional transceiver 406 and antennas 404 can be conductively coupled with the power source and/or network(s) to which the transceiver 206 and antennas 204 are coupled. The additional transceiver 406 and antennas 404 can be provided to allow for multiple cellular communication service providers to provide cells or micro-cells for customers of the different providers in the same fixture system 400.

Figure 5:
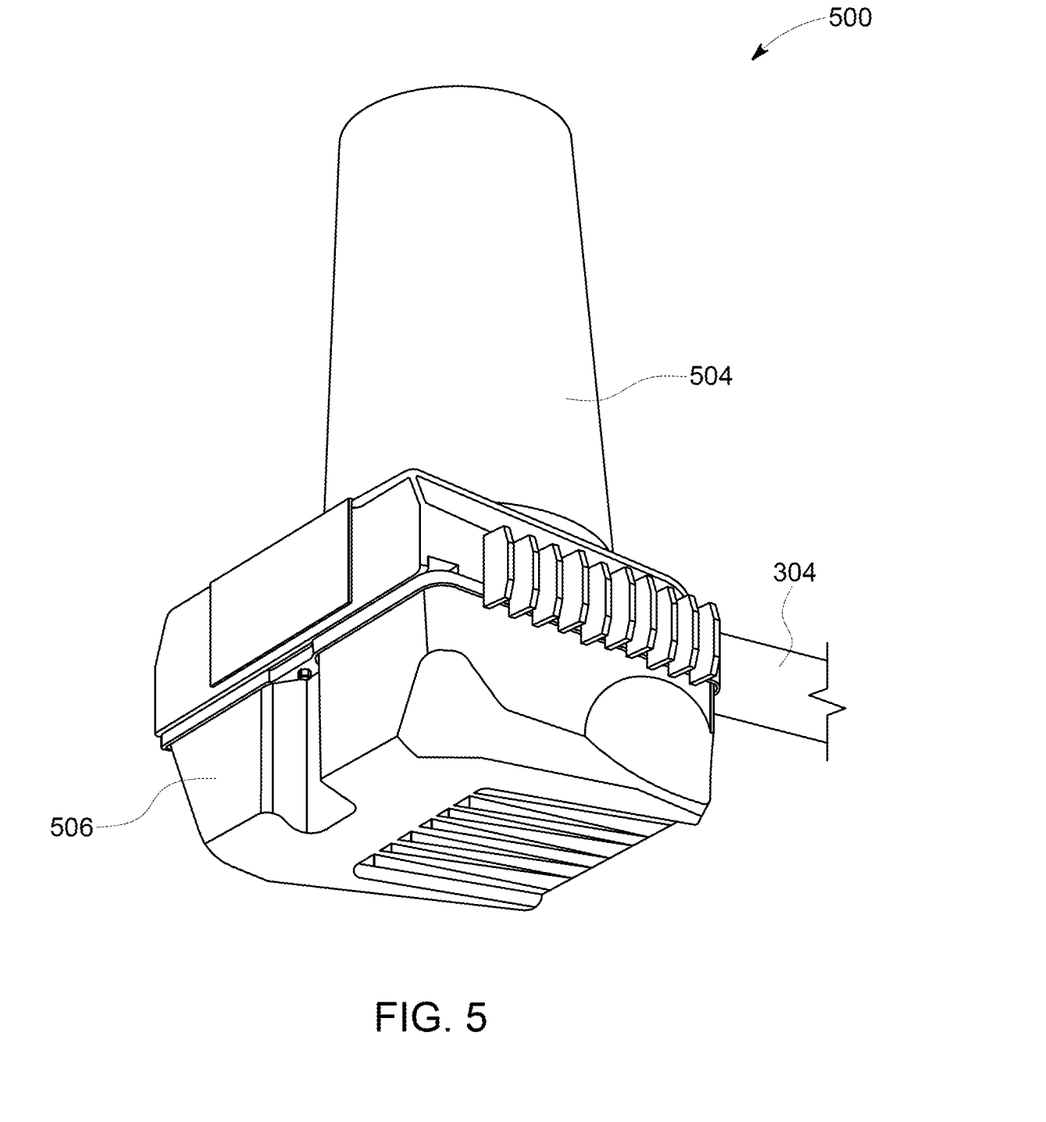
FIG. 5 illustrates a perspective view of another embodiment of a roadway fixture system.

FIG. 5 illustrates a perspective view of another embodiment of a roadway fixture system 500. In contrast to the roadway fixture systems 200, 400, the fixture system 500 does not include any lighting fixture. The fixture system 500 can include a cellular RF transceiver 506 that is similar or identical to one or more of the transceivers 206, 406 shown in FIGS. 2 through 4. One or more antennas 504 of the transceiver 506 can be coupled with the transceiver 506. In the illustrated embodiment, the antennas 504 are enclosed in a protective housing or shell. The transceiver 506 can be mounted with the support 304 described above.

The embodiment of the fixture system 500 can be referred to as a Stand-Alone Configuration (SC). The SC 500 is capable of similar mechanical and electrical functionality as the IC 200, and typically does not need a lighting fixture 100 to which the system 500 is mounted. The SC 500 may advantageously employ such above-described features as a Slip Fitter connection, housing 102, and hinge mounting plate 202. The SC 500 can incorporate an ANSI socket or similar interface for the use with a Light Grid or similar device for the monitoring and control of power. The SC 500 may comprise an Equipment Compartment/mechanical structure that duplicates the Slip Fitter interface and provides a compartment for the incorporation of other components such as transformers, surge suppression, power monitoring, terminal blocks, and the like. The SC 500 can provide a mounting interface for other types of hardware and components.

Figure 6:
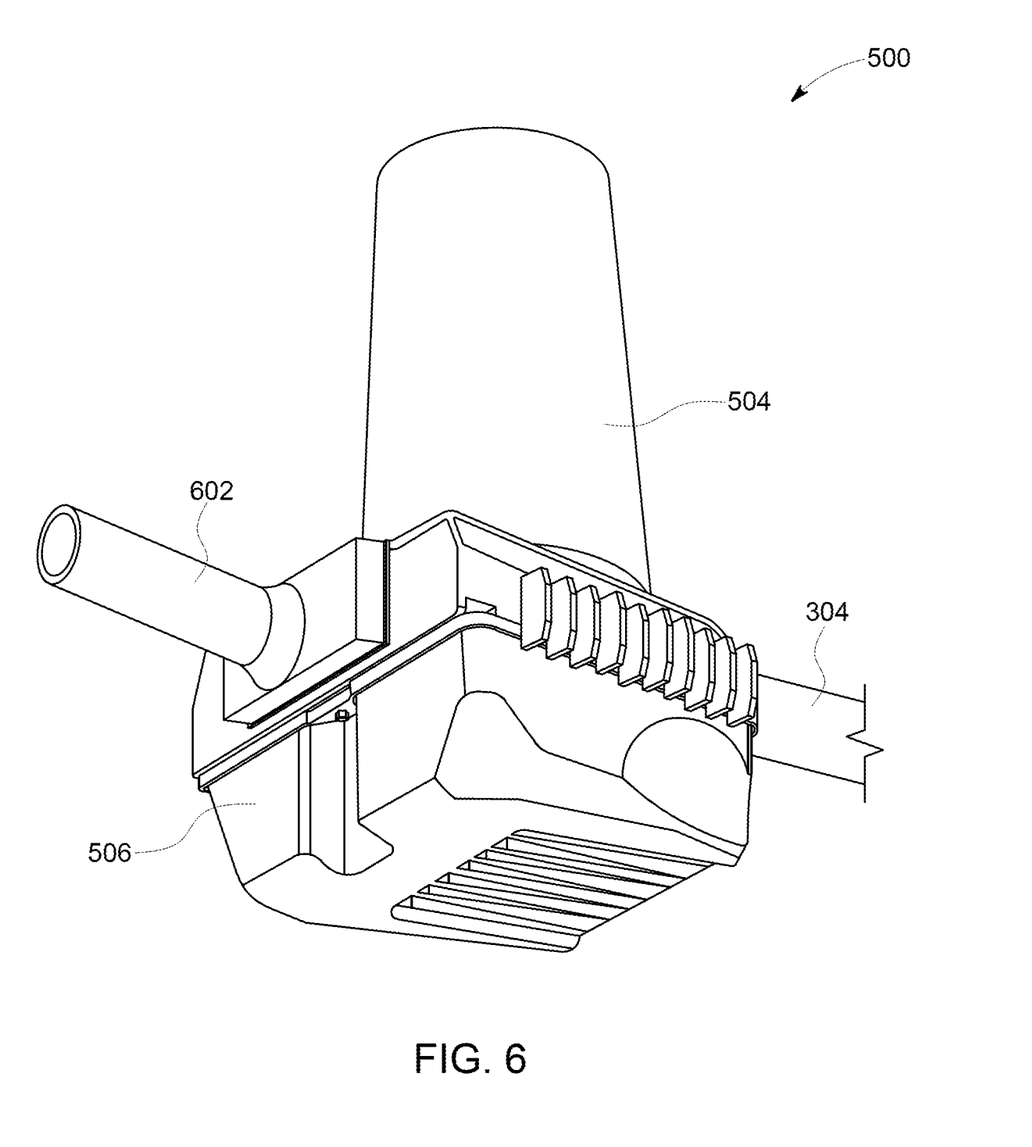
FIG. 6 illustrates a perspective view of another embodiment of a roadway fixture system.

FIG. 6 illustrates a perspective view of another embodiment of a roadway fixture system 600. The fixture system 600 is similar to the fixture system 500 shown in FIG. 5 in that the fixture system 600 does not include any lighting fixture. One difference between the fixture systems 500, 600 is that the fixture system 600 shown in FIG. 6 includes a mounting extension 602. The mounting extension 602 can be used to couple an additional assembly or system to the transceiver 506 in the fixture system 600. This additional assembly or system can include a lighting fixture or another fixture system.

Figure 7:
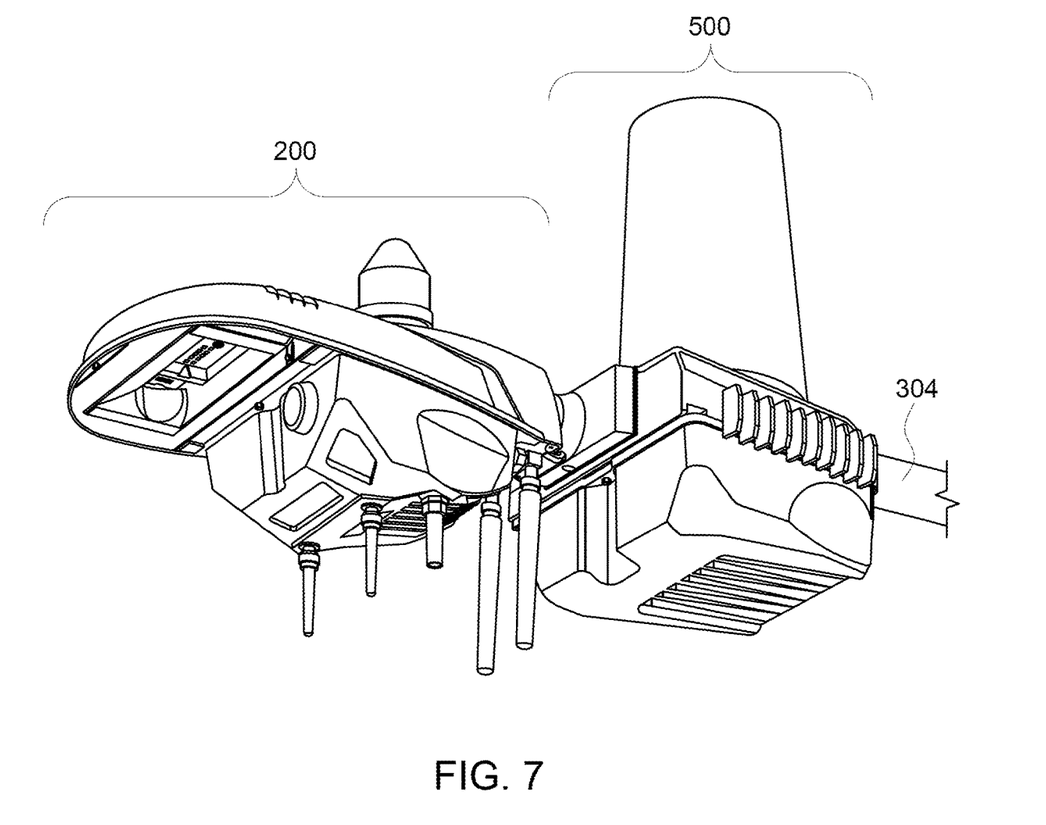
FIG. 7 illustrates a perspective view of the roadway fixture system shown in FIG. 6 that includes the roadway fixture system shown in FIG. 2.

FIG. 7 illustrates a perspective view of the roadway fixture system 600 that includes the roadway fixture system 100. The fixture system 100 is coupled to the mounting extension 602 of the fixture system 600. As a result, the fixture system 600 in FIG. 7 includes the fixture system 100 and the fixture system 600 with two transceivers 206, 506 and lighting devices 104 being present.

The embodiment of the fixture system 600 shown in FIGS. 6 and 7 allows for the SC 500 to be optionally be provided with a mechanical mount or mounting extension 602 such that a light fixture 100 or other device can be attached. This mechanical mount 602 could be an integral part of the SC structure, or could be a separately attached part that could be added in a modular fashion to provide more mounting and interface options. The SC 500 can pass power through the housing of the transceiver 506 and duplicate the electrical wiring interface typically provided by the pole arm 304. In a manner similar to the IC, the SC 500 could have mechanical attachments (e.g., brackets) for the attachment of additional components, such as wi-fi transceivers or sensor systems.

In some embodiments, one may employ the SC to retrofit existing lighting fixtures or other pole-mounted systems, by removing an existing lighting fixture from the mounting arm and replacing the lighting fixture with the SC. The SC could then provide the correct interfaces for the original lighting fixture or other pole-mounted system, onto which the latter could be re-attached, if desired. In some embodiments, the SC may be provided with cooling fins or other cooling assembly for cooling a radio transceiver or other associated hardware. Additional or primary cooling may be provided by a fan or some other active air-movement device such as a synthetic jet system.

In any of the above-described embodiments, there may be provided several modes to link a landline communications system to the transceiver/communications hardware system mounted on the pole or arm. Such modes may comprise standard wired connections such as high speed digital internet connection using Ethernet or other high speed digital communications protocols. Alternatively, a fiber (or other wired-type) data-link to the pole may be converted to a high speed wired digital interface (such as Ethernet) via the use of a conversion device such as a Fiber to Ethernet convertor. This converted interface may then be carried to the communications hardware within the mounted small-cell system of the present disclosure via a hardwired connection using a protocol such as Ethernet and standard cabling equipment such as Cat6 capable cables and connectors. It is also possible that low-loss or lossless compression technologies may be used, which could potentially allow for higher effective bandwidth communications to occur over what may be considered to be low bandwidth links. It is further envisioned that non-landline means of communications may be used such as satellite links, whereby a satellite dish would be co-located with the system to provide a link to the satellite communication network. Once in the satellite network, the data would be introduced into the larger, landline and radio based communications networks.

In some embodiments, a larger antenna or other additional equipment may be needed. In such cases, these larger items may be located remotely from the pole arm mounted system. These remote locations may comprise a mount for the larger item which is located down the pole arm and distal from the small-cell system; a suitable mount may employ a saddle-type clamp or other attachment means.

In some embodiments, the small-cell system must be mounted on a vertical pole without the use of an arm (such as in the situation of a decorative post top for a lighting fixture). Therefore, this small-cell system could be re-configured and used in a vertical fashion rather than in the horizontal pole arm configuration which was previously described. References to positional relationships including but not limited to "horizontal" and "vertical" could be altered to reflect a different mechanical and positional relationship between the parts of the system.

In some embodiments, described cell systems may be mounted and/or powered by utilizing the ANSI socket previously described. This may be accomplished by providing a mated connector for the ANSI socket that extracts power from its line power pins, which would also get its mechanical support from the same socket/connector arrangement. Partial mechanical support could be provided by the ANSI socket and/or all mechanical support could be provided by some adjacent portion of the system, including the pole arm and/or vertical pole. In this latter case, the system would be mounted to the component as mentioned and power would be extracted for the system by mating a connector/cable assembly to the ANSI socket. Together with this power extraction/mechanical support concept, there could be provided another similar ANSI socket on the outward portion for the mating of a traditional ANSI socket compatible accessory, such as a Light Grid node, a photoelectric "eye" assembly, or a shorting cap as previously mentioned. This socket could be directly above the pins which mate to the fixture socket, or could be located elsewhere on the system and provide one or more additional ANSI sockets for use with additional hardware.

Figure 8:
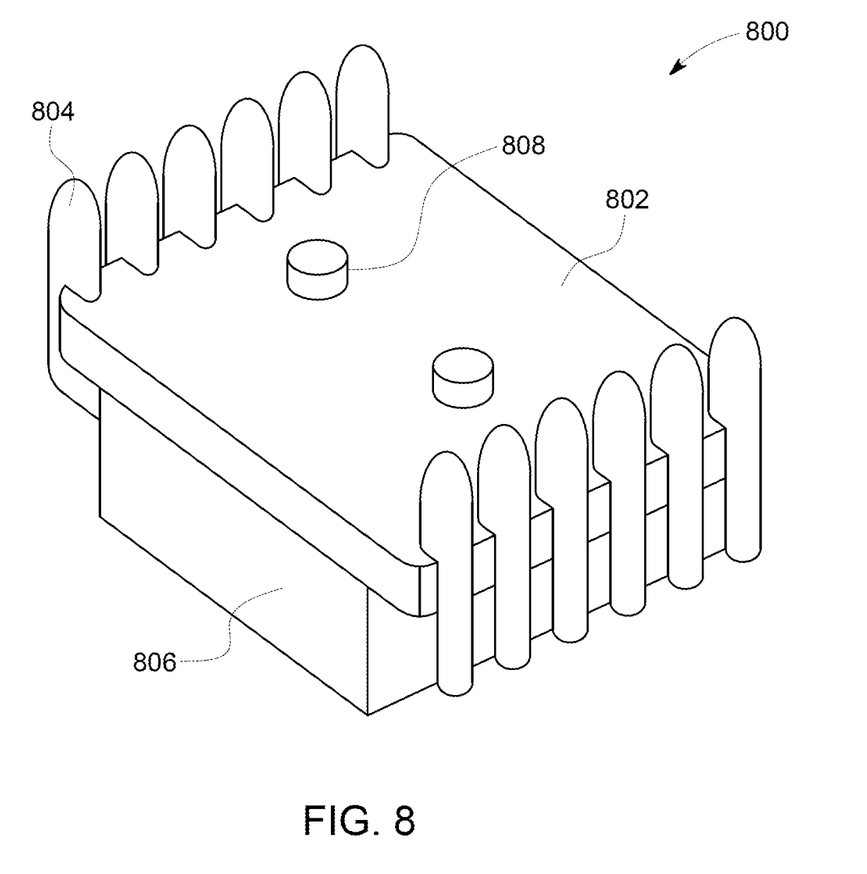
FIG. 8 illustrates a perspective view of one embodiment of a heat sink assembly formed by a combination of an RF transceiver and a mounting plate.
Figure 9:
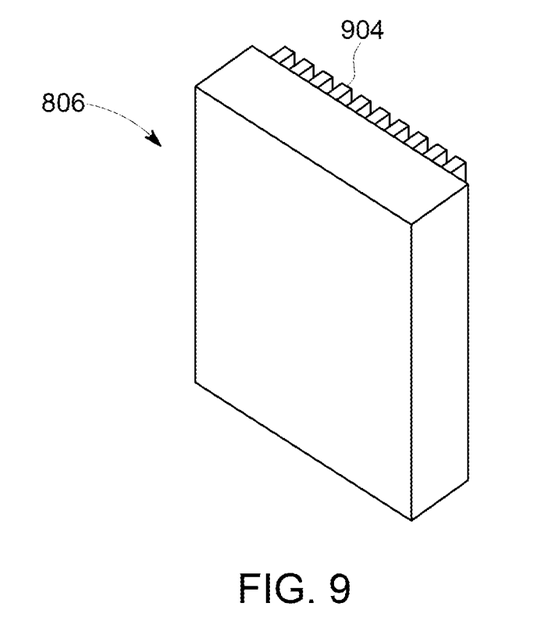
FIG. 9 illustrates a front perspective view of the transceiver shown in FIG. 8 according to one embodiment.
Figure 10:
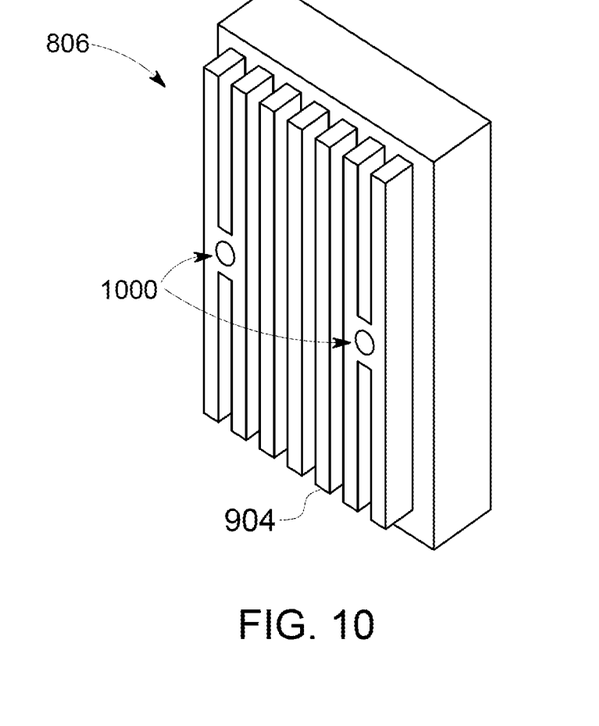
FIG. 10 illustrates a rear perspective view of the transceiver shown in FIG. 8 according to one embodiment.
Figure 11:
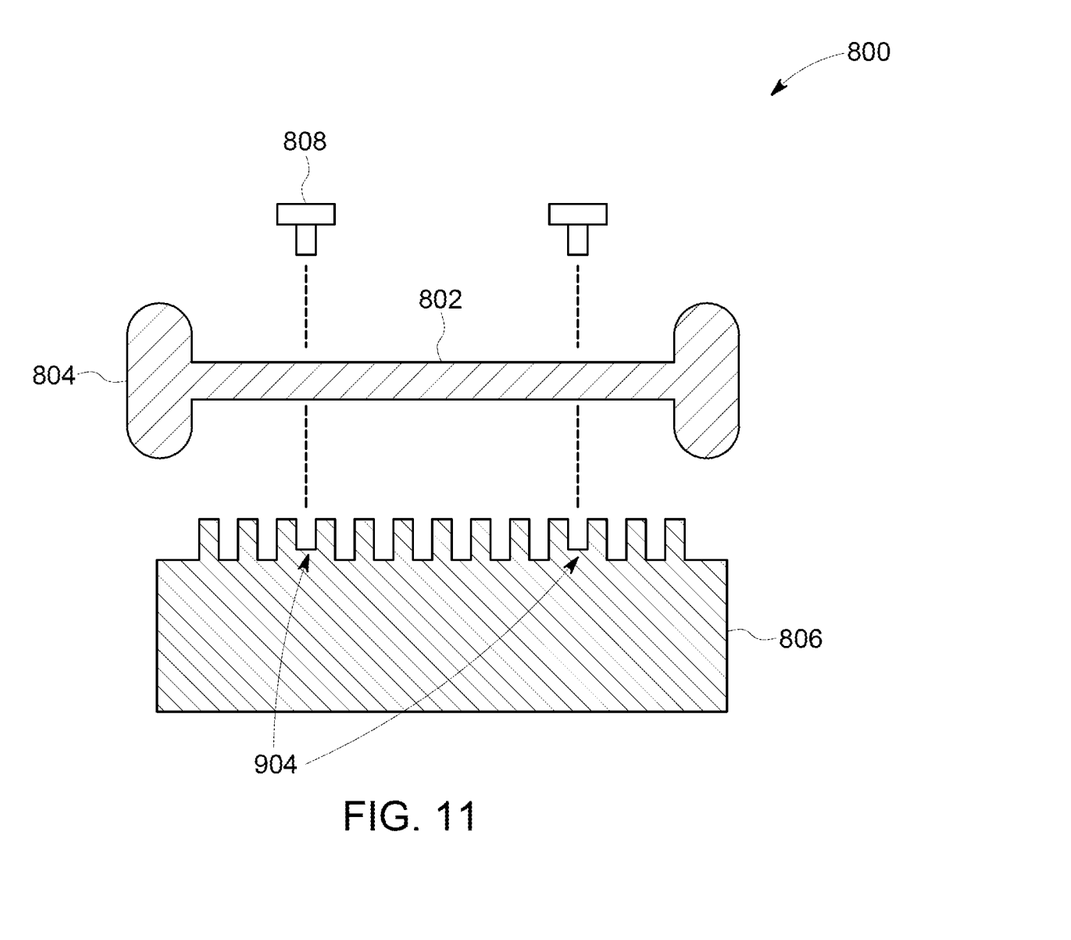
FIG. 11 illustrates an exploded, cross-sectional view of the heat sink assembly shown in FIG. 8 according to one embodiment.

FIGS. 8 through 11 illustrate additional views of cooling components of the fixture systems described herein according to one embodiment. FIG. 8 illustrates a perspective view of one embodiment of an assembly 800 formed by a combination of an RF transceiver 806 and a mounting plate 802. FIG. 9 illustrates a front perspective view of the transceiver 806 according to one embodiment. FIG. 10 illustrates a rear perspective view of the transceiver 806 according to one embodiment. FIG. 11 illustrates an exploded, cross-sectional view of the assembly 800 according to one embodiment.

The transceiver 806 can represent or replace one or more of the transceivers described herein. The mounting plate 802 can represent or replace one or more of the mounting plates described herein. Due to the nature of many transceivers using convection cooling and due to the transceivers being mounted vertically against a pole or wall, it is likely that additional cooling capabilities may be needed when mounted in a horizontal fashion. The assembly 800 provides additional cooling capabilities above and beyond those in one or more of the embodiments of the fixture systems described herein.

As shown in FIGS. 8 and 11, the mounting plate 802 can include convective cooling mechanisms 804, such as elongated, spaced apart ribs, that protrude from opposite sides of the mounting plate 802. The cooling mechanisms 804 of the mounting plate 802 can be oriented such that the direction in which each cooling mechanism 804 is elongated is along the vertical direction when the fixture system having the mounting plate 802 is elongated along a horizontal direction (e.g., parallel to the ground).

As shown in FIGS. 9 through 11, at least one side of the housing of the transceiver 806 can include cooling mechanisms 904. The cooling mechanisms 904 of the transceiver 806 also may be elongated, spaced apart ribs that protrude from the side of the transceiver 806. The cooling mechanisms 904 of the transceiver 806 can be oriented such that the cooling mechanisms 904 are elongated in directions that are transverse or perpendicular to the directions in which the cooling mechanisms 804 of the mounting plate 802 are elongated. For example, the cooling mechanisms 904 of the transceiver 806 can be elongated along horizontal directions. Optionally, the cooling mechanisms 804 and/or 904 can have another shape and/or orientation, such as elongated pins that jut out or otherwise protrude away from the transceiver.

The cooling mechanisms 804, 904 operate as heat sinks for the transceiver 806. The transceiver 806 can include mounting holes or channels 1000 through which fasteners 808 can extend to couple the transceiver 806 to the mounting plate 802. Outer ends of the cooling mechanisms 904 of the transceiver 806 abut one side of the mounting plate 802. This provides gaps or channels between the cooling mechanisms 904 and between the areas of the transceiver 806 that do not include cooling mechanisms 904 and the mounting plate 802. Fluid, such as air, can flow between the cooling mechanisms 804 of the mounting plate 802 and can flow between the cooling mechanisms 904 of the transceiver 806 to draw thermal energy away from the transceiver 806 and mounting plate 802 to cool the transceiver 806. Optionally, one or more of the components (e.g., the transceiver, mounting plate, cooing mechanisms, etc.) may include or be formed from thermal interface materials (TIMs), either rigid or conformable, or include other materials (e.g., thermal greases) to assist in conducting heat away from the transceivers.

The transceivers described herein may be designed to operate in open spaces where air flow typically is sufficient to cool the transceivers (and prevent thermal damage to components of the transceivers). But, in coupling the transceivers to lighting fixtures as described herein, the transceivers may receive less air flow and, as a result, may not cool as effectively. The cooling mechanisms 804, 904 allow for heat from the transceivers to be efficiently conducted to the ambient environment to assist with cooling the transceivers.

While the mounting plates and transceivers are shown and described herein as being separate parts, alternatively the mounting plate may be an integral and inseparable part of the transceiver or the housing of the lighting fixture. The housing of the transceiver may be provided with components needed to connect the transceiver to the housing of the lighting fixture that otherwise would be included in the mounting plate. Alternatively, the transceiver, mounting plate, and housing of the lighting fixture may be formed as a single, integral, and inseparable body.

The inventive subject matter described herein also provides one or more methods for providing or manufacturing the fixture systems described herein. The order of the operations in these methods may be modified from the order in which the operations are described. One such method can include directly or indirectly coupling an RF transceiver with a fixture support that is configured to also be coupled with a lighting fixture. The method also can include directly or indirectly coupling an antenna with the fixture support such that the antenna is conductively coupled with the transceiver. The transceiver and the antenna can be coupled with the fixture support by retrofitting the transceiver and the antenna to a pre-existing fixture support. The fixture support can be a roadway or roadside lighting fixture support. Optionally, coupling the transceiver with the fixture support and coupling the antenna with the fixture support can include mounting the RF transceiver and the antenna on the fixture support without the lighting fixture being present.

With respect to retrofitting, the access door of a lighting fixture that is already mounted to a pole, other object, or other surface is removed, and a mounting plate of transceiving equipment is coupled with the lighting fixture in the location where the access door previously was located. The mounting plate can have the same size and/or shape of the access door so that the transceiving equipment can easily be mounted to the lighting fixture. The transceiving equipment can be coupled with a variety of differently shaped and/or sized mounting plates to allow for the same transceiving equipment to be retrofitted to a variety of different lighting fixtures having access doors of different shapes and/or sizes.

The method also can include conductively coupling one or both of the RF transceiver and the antenna with a power supply that also powers a lighting fixture. The method optionally can include conductively coupling the transceiver and/or the antenna with one or more battery cells or batteries that are configured to electrically power the transceiver and/or the antenna responsive to an interruption of power from the power supply to the transceiver, the antenna, or both the transceiver and the antenna.

The method optionally includes coupling a mounting plate with one or more auxiliary components with the antenna. The one or more auxiliary hardware components can include power filtering hardware, power measuring hardware, a fiber interface component, additional transceiver equipment, a camera, a sensor, a wireless network transceiver, and/or a telephone interface component.

Optionally, the method includes connecting a wired network connection between the transceiver and one or more networks. The method can include thermally coupling a heat sink with the transceiver. The method optionally can include applying an RF reflective coating and/or an RF absorbing coating to one or more surfaces of a housing to which the transceiver and the antenna are configured to be coupled. The RF reflective coating and/or the RF absorbing coating modify a cellular beam pattern of the antenna.

In one embodiment, a system includes a lighting fixture having an outer housing that holds one or more light devices. The outer housing includes an access door through which an interior of the lighting fixture is accessible. The system also includes a radio frequency (RF) transceiver configured to send and receive cellular communications. The RF transceiver includes a mounting plate that is sized and shaped to fit into a space occupied by the access door of the outer housing of the lighting fixture so that the RF transceiver is mounted to the lighting fixture.

Optionally, the RF transceiver is a low power, micro-cell cellular transceiver.

Optionally, the RF transceiver is configured to be retrofitted to a pre-existing lighting fixture support.

Optionally, the lighting fixture support is a pole arm or a horizontally oriented portion of a pole.

Optionally, the RF transceiver is configured to be mounted to the lighting fixture support without the lighting fixture being present.

Optionally, the RF transceiver is configured to be conductively coupled with and electrically powered by a power supply that also powers the lighting fixture.

Optionally, the system also includes one or more battery cells configured to be conductively coupled with the RF transceiver. The one or more battery cells can be configured to electrically power the RF transceiver responsive to an interruption of power from the power supply to the RF transceiver.

Optionally, the system also includes a wired network connection configured to communicatively couple the RF transceiver with one or more networks.

Optionally, the system also includes a heat sink configured to be thermally coupled with the RF transceiver.

Optionally, the system also includes a housing to which the RF transceiver is configured to be coupled. The one or more surfaces of the housing can include one or more of an RF reflective coating or an RF absorbing coating configured to modify a cellular beam pattern of the RF transceiver.

In one embodiment, a method includes removing an access door in an outer housing of a lighting fixture having one or more lighting devices. The access door providing access into an interior of the outer housing. The method also includes coupling a mounting plate of a radio frequency (RF) transceiver with the outer housing of the lighting fixture in a location from which the access door of the outer housing was removed. The RF transceiver is configured to send and receive cellular communications.

Optionally, the method also includes conductively coupling the RF transceiver with a power source that also powers the one or more lighting devices of the lighting fixture.

Optionally, the lighting fixture is a pre-existing lighting fixture and the RF transceiver is configured to be retrofitted to the pre-existing lighting fixture by coupling the RF transceiver to the lighting fixture after removing the access door of the lighting fixture.

Optionally, the method also includes thermally coupling a heat sink with the RF transceiver.

In one embodiment, a system includes a radio frequency (RF) transceiver configured to send and receive cellular communications, and a mounting plate coupled with the RF transceiver. The mounting plate is shaped and sized to fit into an access door opening through an outer housing of a lighting fixture. The mounting plate is configured to be at least partially received into the access door opening of the lighting fixture after removal of an access door of the outer housing of the lighting fixture.

Optionally, the RF transceiver is a low power, micro-cell cellular transceiver.

Optionally, the RF transceiver is configured to be retrofitted to a pre-existing lighting fixture support.

Optionally, the RF transceiver is conductively coupled with and electrically powered by a power supply that also powers the lighting fixture.

Optionally, the system also includes a wired network connection configured to communicatively couple the RF transceiver with one or more networks.

Optionally, one or more surfaces of the outer housing include one or more of an RF reflective coating or an RF absorbing coating configured to modify a cellular beam pattern of the RF transceiver.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
    removing an access door in an outer housing of a lighting fixture having one or more lighting devices, the access door providing access into an interior of the outer housing; and
    coupling a mounting plate of a radio frequency (RF) transceiver with the outer housing of the lighting fixture in a location from which the access door of the outer housing was removed, the RF transceiver configured to send and receive cellular communications.

2. The method of claim 1, further comprising conductively coupling the RF transceiver with a power source that also powers the one or more lighting devices of the lighting fixture.

3. The method of claim 1, wherein the lighting fixture is a pre-existing lighting fixture and the RF transceiver is configured to be retrofitted to the pre-existing lighting fixture by coupling the RF transceiver to the lighting fixture after removing the access door of the lighting fixture.

4. The method of claim 1, further comprising thermally coupling a heat sink with the RF transceiver.

\* \* \* \* \*